United States Patent
Yokoyama et al.

(10) Patent No.: US 12,322,930 B2
(45) Date of Patent: Jun. 3, 2025

(54) INSULATOR AND SPARK PLUG

(71) Applicant: Niterra Co., Ltd., Nagoya (JP)

(72) Inventors: Yutaka Yokoyama, Nagoya (JP); Toshiki Kon, Nagoya (JP); Ippei Kato, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/575,062

(22) PCT Filed: Jul. 21, 2022

(86) PCT No.: PCT/JP2022/028314
§ 371 (c)(1),
(2) Date: Dec. 28, 2023

(87) PCT Pub. No.: WO2023/008300
PCT Pub. Date: Feb. 2, 2023

(65) Prior Publication Data
US 2024/0305070 A1  Sep. 12, 2024

(30) Foreign Application Priority Data
Jul. 27, 2021  (JP) .................. 2021-122439

(51) Int. Cl.
*H01T 13/38* (2006.01)
*H01T 13/60* (2011.01)
(52) U.S. Cl.
CPC ............ *H01T 13/38* (2013.01); *H01T 13/60* (2013.01)
(58) Field of Classification Search
CPC ....................................... H01T 13/38
USPC .......................................... 313/137
See application file for complete search history.

(56) References Cited

U.S. PATENT DOCUMENTS

| 2010/0084960 | A1 | 4/2010 | Kurono et al. |
| 2012/0080996 | A1* | 4/2012 | Takaoka ............ C04B 35/62655 313/141 |
| 2017/0093132 | A1* | 3/2017 | Isasa ....................... H01T 13/38 |
| 2017/0093133 | A1 | 3/2017 | Yoshida et al. |

FOREIGN PATENT DOCUMENTS

| JP | 2017-62878 A | 3/2017 |
| WO | 2009/119097 A1 | 10/2009 |

OTHER PUBLICATIONS

International Search Report (PCT/ISA/210) issued on Oct. 4, 2022 by the International Searching Authority in International Patent Application No. PCT/JP2022/028314.

\* cited by examiner

*Primary Examiner* — Christopher M Raabe
(74) *Attorney, Agent, or Firm* — Sughrue Mion, PLLC

(57) ABSTRACT

A spark plug (1) includes a tubular insulator (50). The insulator contains alumina as a primary component, and further contains a secondary component. The secondary component contains a silicon (Si) component, a magnesium (Mg) component, a barium (Ba) component, a calcium (Ca) component, and a rare earth component. The amounts (mass %) of these components as reduced to oxide and relative to the total mass of the secondary component satisfy specific conditions.

5 Claims, 2 Drawing Sheets

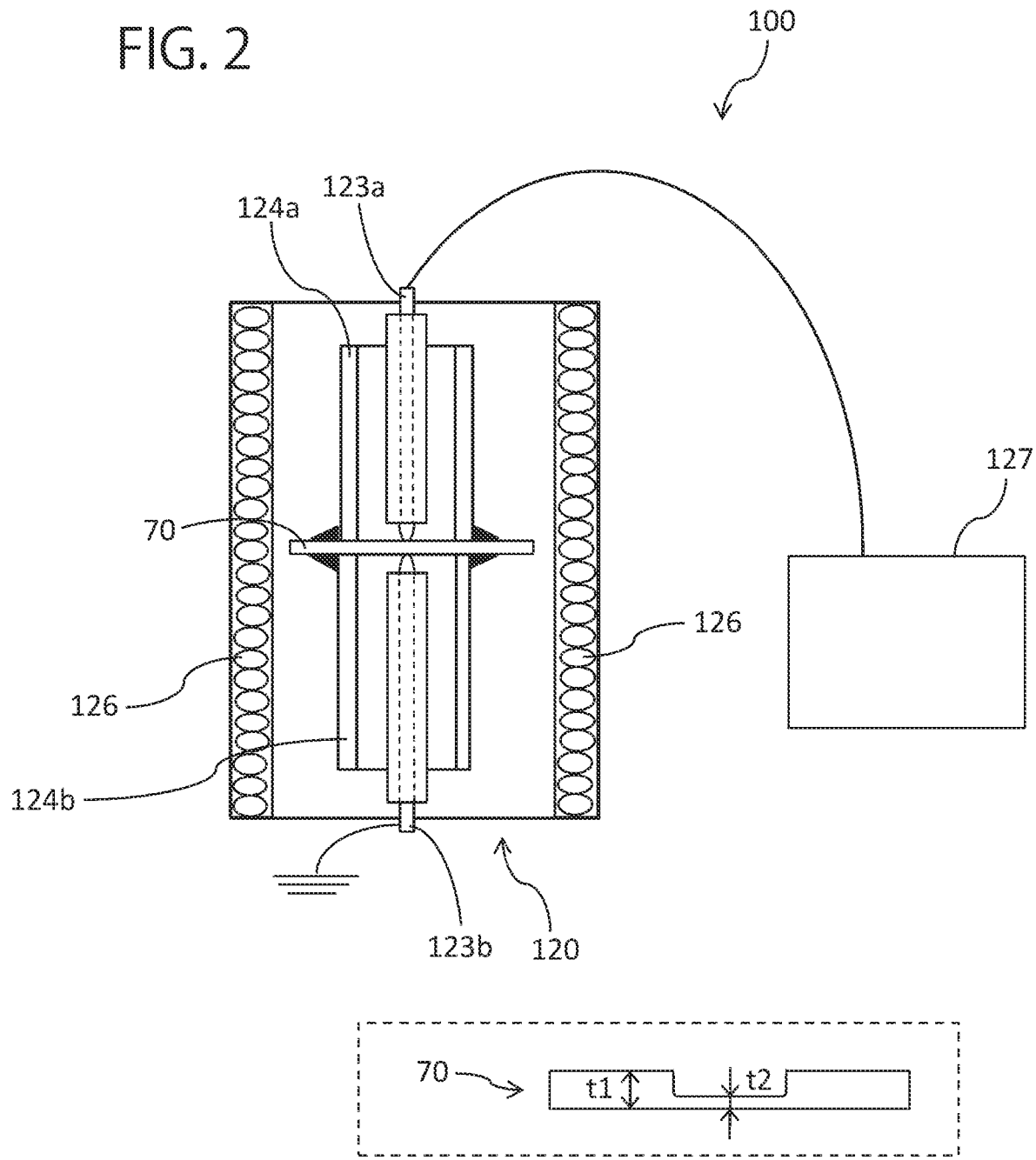

INSULATOR AND SPARK PLUG

CROSS-REFERENCE TO RELATED APPLICATIONS

This application is a National Phase Entry of PCT International Application No. PCT/JP2022/028314 filed on Jul. 21, 2022, which claims priority to Japanese Patent Application No. 2021-122439 filed on Jul. 27, 2021.

TECHNICAL FIELD

The present disclosure relates to an insulator used in a spark plug used for an internal combustion engine, and to a spark plug including this insulator.

BACKGROUND ART

Spark plugs have been used as igniting means of internal combustion engines such as engines for automobiles. Such a spark plug generally includes a rod-shaped center electrode, an insulator which holds the center electrode on its forward end side and extends in an axial direction, a tubular metallic shell which holds the insulator therein, and a ground electrode attached to the metallic shell.

The insulator used in the spark plug is formed of, for example, an alumina sintered body containing alumina ($Al_2O_3$) as a primary component. The insulator formed of the alumina sintered body can lead to improvements in heat resistance, mechanical strength, etc.

The alumina sintered body contains a sintering aid besides alumina for the purpose of, for example, lowering the firing temperature and improving sinterability. The sintering aid contains aid components, for example, a silicon (Si) component, a barium (Ba) component, a magnesium (Mg) component, and a calcium (Ca) component. Such a component is contained in the alumina sintered body in the form of an oxide, such as silicon oxide ($SiO_2$), barium oxide (BaO), magnesium oxide (MgO), or calcium oxide (CaO).

For example, Patent Literature 1 discloses that an insulator used in a spark plug is formed of an alumina-based sintered body having a theoretical density ratio of 95.0% or more and containing a rare earth element (RE) component, an Si component, and Group 2 element (2A) components containing Mg and Ba (as essentials) and at least one element (other than Mg and Ba) among Group 2 elements of the periodic table based on IUPAC Recommendations 1990, wherein the rare earth element (RE) component is dispersed so as to satisfy specific conditions.

CITATION LIST

Patent Literature

Patent Literature 1: WO 2009/119097

SUMMARY OF INVENTION

Technical Problem

According to recent tendencies, the temperature in a combustion chamber is elevated for enhancing the output of an internal combustion engine and improving fuel efficiency. Therefore, the spark plug may be exposed to a higher temperature environment (e.g., about 900° C.) as compared with conventional ones. Assuming that the spark plug is placed in such a high temperature environment, the spark plug may fail to exhibit sufficient withstand voltage unless the insulation performance of the insulator is further improved.

In view of the foregoing, an object in a first aspect of the present disclosure is to provide an insulator for a spark plug capable of further improving withstand voltage particularly at high temperatures, and a spark plug including this insulator.

Solution to Problem

A first aspect of the present disclosure is directed to a tubular insulator for a spark plug. The insulator contains alumina as a primary component, and further contains a secondary component. The secondary component contains a silicon (Si) component, a magnesium (Mg) component, a barium (Ba) component, a calcium (Ca) component, and a rare earth component, and the amounts (mass %) of these components as reduced to oxide and relative to the total mass of the secondary component satisfy the following relations (1) to (5):

$$15.5 \leq \text{(the amount of the Si component)} \leq 55.1; \quad (1)$$

$$0.6 \leq \text{(the amount of the Mg component)} \leq 7.4; \quad (2)$$

$$26.7 \leq \text{(the amount of the Ba component)} \leq 68.5; \quad (3)$$

$$1.1 \leq \text{(the amount of the Ca component)} \leq 32.4; \text{ and} \quad (4)$$

$$11.4 \leq \text{(the amount of the rare earth component)} \leq 46.5. \quad (5)$$

By virtue of the above-described configuration, the insulator can exhibit sufficient insulation performance even when used in a high temperature environment (e.g., about 900° C.). Therefore, there can be provided a spark plug including the insulator capable of further improving withstand voltage particularly at high temperatures.

In the above-described insulator according to the first aspect of the present disclosure, the amount (mass %) of the alumina relative to the total mass of the insulator may fall within a range of 91.0 mass % to 97.0 mass %.

The above-described configuration can further improve the withstand voltage of the insulator.

In the above-described insulator according to the first aspect of the present disclosure, the amounts (mass %) of the Ba component and the rare earth component as reduced to oxide and relative to the total mass of the secondary component may further satisfy the following relations (a) and (b):

$$29.1 \leq \text{(the amount of the Ba component)} \leq 52.5; \text{ and} \quad (a)$$

$$12.4 \leq \text{(the amount of the rare earth component)} \leq 41.5. \quad (b)$$

The above-described configuration can further improve the withstand voltage of the insulator.

In the above-described insulator according to the first aspect of the present disclosure, the amounts (mass %) of the Ba component and the rare earth component as reduced to oxide and relative to the total mass of the secondary component may further satisfy the following relations (A) and (B):

$$30.6 \leq \text{(the amount of the Ba component)} \leq 35.3; \text{ and} \quad (A)$$

$$17.4 \leq \text{(the amount of the rare earth component)} \leq 29.7. \quad (B)$$

The above-described configuration can further improve the withstand voltage of the insulator.

In the above-described insulator according to the first aspect of the present disclosure, the rare earth component may be a lanthanum (La) component. This configuration can further improve the withstand voltage of the insulator.

A second aspect of the present disclosure is directed to a spark plug. The spark plug comprises the above-described insulator according to the first aspect of the present disclosure: a tubular metallic shell which holds at least a portion of the insulator therein; a center electrode which is disposed at a forward end of the insulator; and a ground electrode which is attached to the metallic shell and provides a gap between the ground electrode and the center electrode.

By virtue of the above-described configuration, the spark plug, which comprises the insulator according to the first aspect of the present disclosure, can exhibit excellent withstand voltage, particularly at high temperatures.

Advantageous Effects of Invention

As described above, according to the first aspect of the present disclosure, the withstand voltage of the insulator used for a spark plug used particularly in a high temperature environment can be further improved.

BRIEF DESCRIPTION OF DRAWINGS

FIG. 2 Schematic view showing the structure of a withstand voltage measuring apparatus used for a high temperature withstand voltage test in the present example. A cross section of a test piece used in the high temperature withstand voltage test is schematically shown in the broken line frame of FIG. 2.

DESCRIPTION OF EMBODIMENTS

Figure 1:
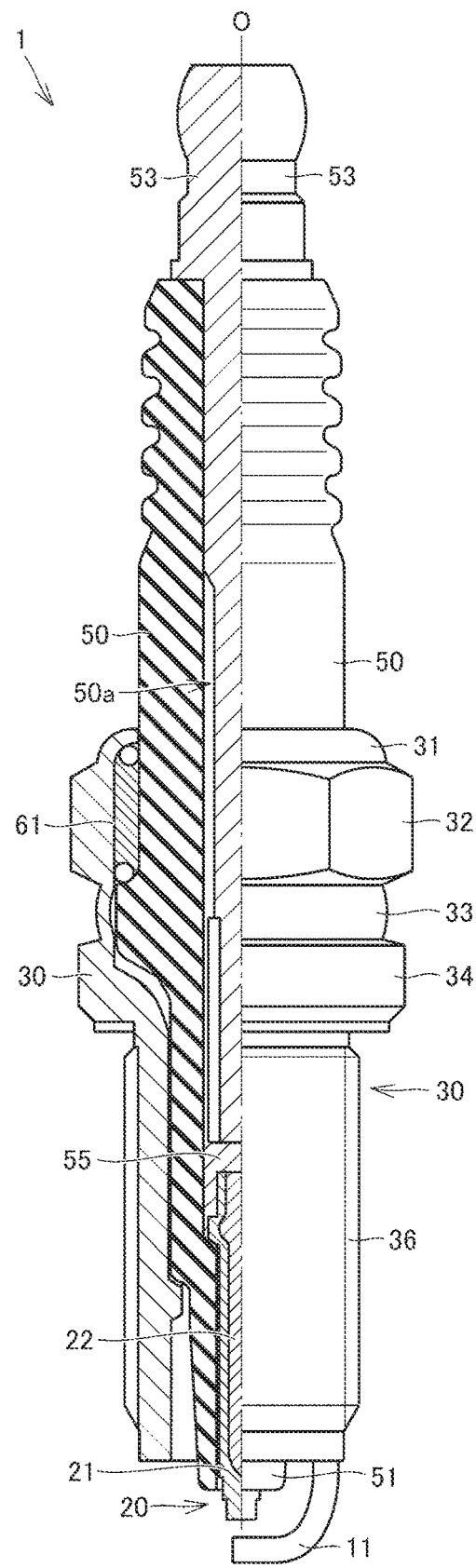
FIG. 1 Partial sectional view showing the appearance and internal structure of a spark plug according to one embodiment.

An embodiment of the present invention will now be described with reference to the drawings. In the following description, identical components are denoted by the same reference sign. Their names and functions are the same. Therefore, detailed description of the identical components will not be repeated.

In the present embodiment, a spark plug 1 will be described as an example. Also, in the present embodiment, a method for manufacturing an insulator 50 which constitutes the spark plug 1 will be described.

(Structure of Spark Plug)

First, the overall structure of the spark plug 1 will be described with reference to FIG. 1. The spark plug 1 includes an insulator 50 and the metallic shell 30.

The insulator 50 is an approximately cylindrical tubular member extending in a longitudinal direction of the spark plug 1. An axial hole 50a extending along an axial line O is formed in the insulator 50. The insulator 50 is formed of a material which is excellent in insulating property, heat resistance, and heat conductivity. For example, the insulator 50 is formed of an alumina-based ceramic material or the like.

A center electrode 20 is provided in a forward end portion 51 of the insulator 50. In the present embodiment, a side in the spark plug 1 and the insulator 50 where the center electrode 20 is provided will be referred to as the forward end side of the spark plug 1 or the insulator 50, and a side opposite the forward end side will be referred to as the rear end side. In FIG. 1, the lower side is the forward end side, and the upper side is the rear end side.

A metallic terminal member 53 is attached to the other end (namely, a rear end portion) of the insulator 50. An electrically conductive glass seal 55 is provided between the center electrode 20 and the metallic terminal member 53.

The center electrode 20 is inserted into and held in the axial hole 50a of the insulator 50 in such a manner that a forward end portion of the center electrode 20 protrudes from the forward end portion 51 of the insulator 50. The center electrode 20 has an electrode base member 21 and a core 22. The electrode base member 21 is formed of, for example, a metallic material such as an Ni-base alloy containing Ni (nickel) as a main component. An example of an alloy element added to the Ni-base alloy is Al (aluminum). The core 22 is embedded in the electrode base member 21. The core 22 may be formed of a metallic material (for example, Cu (copper) or Cu alloy or the like) which is more excellent in thermal conductivity than the electrode base member 21. The electrode base member 21 and the core 22 are united together by means of forging. Notably, this configuration is one example, and the core 22 may be omitted. Namely, the center electrode 20 may be formed of the electrode base member only.

The metallic shell 30 is an approximately cylindrical tubular member which is fixed to a threaded hole of an internal combustion engine. The metallic shell 30 is provided to partially cover the insulator 50. In a state in which a portion of the insulator 50 has been inserted into the metallic shell 30 having an approximately cylindrical tubular shape, a gap present between the metallic shell 30 and the insulator 50 on the rear end side of the metallic shell 30 is filled with talc 61.

The metallic shell 30 is formed of a metallic material having electrical conductivity. Examples of such a metallic material include low carbon steel and a metallic material which contains iron as a main component. The metallic shell 30 has mainly a crimp portion 31, a tool engagement portion 32, a curved portion 33, a bearing portion 34, a trunk portion 36, etc., which are disposed in this order from the rear end side.

The tool engagement portion 32 is a portion with which a tool such as a wrench is engaged when the metallic shell 30 is attached to the threaded hole of the internal combustion engine. The crimp portion 31 is formed on the rear end side of the tool engagement portion 32. The crimp portion 31 is bent radially inward such that the degree of bending increases toward the rear end side. The bearing portion 34 is located between the tool engagement portion 32 and the trunk portion 36, and an annular gasket is disposed on the forward end side. In a state in which the spark plug 1 is attached to the internal combustion engine, the bearing portion 34 presses the annular gasket against an unillustrated engine head. The curved portion 33 having a small wall thickness is formed between the tool engagement portion 32 and the bearing portion 34. The trunk portion 36 is located on the side where the forward end portion 51 of the insulator 50 is present. When the spark plug 1 is attached to the internal combustion engine, a screw groove (not shown) formed on the outer circumference of the trunk portion 36 is screwed into the threaded hole of the internal combustion engine.

Also, a ground electrode 11 is provided on the forward end portion side of the metallic shell 30 (on the side where the trunk portion 36 is located). The ground electrode 11 is joined to the metallic shell 30 by means of, for example, welding. The ground electrode 11 is a plate-like member bent to have an approximately L-like shape as a whole, and a proximal end portion of the ground electrode 11 is fixedly joined to a forward end surface of the metallic shell 30. A distal end portion of the ground electrode 11 extends to a position through which an imaginary extension line of the axial line O of the insulator 50 passes. A noble metal tip (not shown) which faces a forward end surface of the center electrode 20 is welded to a surface of the ground electrode 11, which surface is located on the side toward the center electrode 20, such that the noble metal tip is located near the distal end portion of the ground electrode 11.

As a result, the distal end portion of the ground electrode 11 is disposed to face the forward end portion of the center electrode 20, and a gap in which spark discharge occurs is formed between the distal end portion of the ground electrode 11 (specifically, the noble metal tip welded to the ground electrode 11) and the forward end portion of the center electrode 20.

The ground electrode 11 is formed, for example, by using, as an electrode base material, a metallic material such as an Ni-base alloy containing Ni (nickel) as a main component. An example of an alloy element added to the Ni-base alloy is Al (aluminum). The ground electrode 11 may contain, as a component other than Ni, at least one element selected from Mn (manganese), Cr (chromium), Al (aluminum), and Ti (titanium).

(Structure and Composition of Insulator)

The structure of the insulator 50, which constitutes the spark plug 1, will be described more specifically. The insulator 50 is formed of an alumina sintered body containing alumina ($Al_2O_3$) as a primary component.

The alumina sintered body forming the insulator 50 contains alumina as a primary component. The expression "the insulator 50 contains alumina as a primary component" as used herein refers to the case where the amount of alumina is the largest among those of various compounds contained in the insulator 50. In the alumina sintered body, most of the Al component is present in the form of alumina crystals. Thus, it can be confirmed that the alumina content is the highest in the insulator 50 by, for example, determining that the amount by mass of the Al component (as reduced to oxide) is the greatest relative to the total mass of elements (as reduced to oxide) detected through fluorescent X-ray analysis of the alumina sintered body forming the insulator 50. In the insulator 50, a portion of the Al component may be present in crystals other than alumina crystals.

In the present embodiment, the amount (mass %) of alumina ($Al_2O_3$) (i.e., primary component) contained in the alumina sintered body forming the insulator 50 preferably falls within a range of 91.0 mass % to 97.0 mass % relative to the total mass of the insulator. The amount of alumina relative to the total mass of the insulator may be calculated by, for example, polishing a cut surface of the alumina sintered body prepared through cutting of the insulator 50 vertically to the axial line O, and determining the amount by mass of the Al component (as reduced to oxide) relative to the total mass of elements (as reduced to oxide) detected through fluorescent X-ray analysis of the polished surface.

When the amount of alumina in the insulator 50 falls within the aforementioned range, properties such as withstand voltage and mechanical strength can be further improved. When the alumina content exceeds 97.0 mass %, sinterability may be deteriorated, resulting in insufficient withstand voltage. When the alumina content is less than 91.0 mass %, the relative amount of a glass phase increases. Thus, the glass phase may be softened and expanded at a high temperature (e.g., about 900° C.), and conductive paths may be thickened, resulting in insufficient withstand voltage.

The alumina contained in the insulator 50 is derived from, for example, alumina powder added in a raw material of the alumina sintered body.

The alumina sintered body forming the insulator 50 further contains a secondary component besides alumina. The secondary component is derived mainly from a sintering aid for achieving, for example, a lowering in firing temperature and an improvement in sinterability. Thus, the secondary component contains an aid component. The secondary component contains, for example, a silicon (Si) component, a magnesium (Mg) component, a barium (Ba) component, a calcium (Ca) component, and a rare earth component.

The amounts R (mass %) of these components as reduced to oxide and relative to the total mass of the secondary component satisfy the following relations (1) to (5):

$$15.5 \leq \text{(the amount of the Si component)} \leq 55.1; \quad (1)$$

$$0.6 \leq \text{(the amount of the Mg component)} \leq 7.4; \quad (2)$$

$$26.7 \leq \text{(the amount of the Ba component)} \leq 68.5; \quad (3)$$

$$1.1 \leq \text{(the amount of the Ca component)} \leq 32.4; \text{ and} \quad (4)$$

$$11.4 \leq \text{(the amount of the rare earth component)} \leq 46.5. \quad (5)$$

Notably, the aforementioned amounts R correspond to the amounts by mass (mass %) of the elements (Si, Mg, Ba, Ca, and rare earth element) as reduced to oxide and relative to the total mass of the secondary component, wherein the elements are detected through fluorescent X-ray analysis of the alumina sintered body.

The Si component is present in the form of, for example, oxide or ion in the alumina sintered body: The Si component melts during sintering to generally form a liquid phase, and thus serves as a sintering aid for promoting the densification of the alumina sintering body. After sintering, the Si component is present as a glass phase or crystals (other than alumina crystals) together with other elements such as Al.

The oxide of the Si component is, for example, $SiO_2$. Thus, the amount of the Si component as reduced to oxide and relative to the total mass of the secondary component; i.e., the amount $R_{SiO2}$ (mass %), may be defined as (the mass of the Si component in terms of $SiO_2$)/(the total mass of the secondary component as reduced to oxide).

The Si component contained in the insulator 50 is derived from, for example, $SiO_2$ powder contained in a raw material used for the production of the alumina sintered body.

The Mg component, the Ba component, or the Ca component is present in the form of, for example, oxide or ion in the alumina sintered body. Each of these components melts during sintering to generally form a liquid phase, and thus serves as a sintering aid for promoting the densification of the alumina sintering body. After sintering, each of these components is present as a glass phase or crystals (other than alumina crystals) together with other elements such as Al.

The oxide of the Mg component is, for example, MgO. Thus, the amount of the Mg component as reduced to oxide and relative to the total mass of the secondary component; i.e., the amount $R_{MgO}$ (mass %), may be defined as (the mass of the Mg component in terms of MgO)/(the total mass of the secondary component as reduced to oxide). The Mg component contained in the insulator 50 is derived from, for example, $MgCO_3$ powder or MgO powder contained in a raw material used for the production of the alumina sintered body.

The oxide of the Ba component is, for example, BaO. Thus, the amount of the Ba component as reduced to oxide and relative to the total mass of the secondary component; i.e., the amount $R_{BaO}$ (mass %), may be defined as (the mass of the Ba component in terms of BaO)/(the total mass of the secondary component as reduced to oxide). The Ba component contained in the insulator 50 is derived from, for example, $BaCO_3$ powder or BaO powder contained in a raw material used for the production of the alumina sintered body.

The oxide of the Ca component is, for example, CaO. Thus, the amount of the Ca component as reduced to oxide and relative to the total mass of the secondary component; i.e., the amount $R_{CaO}$ (mass %), may be defined as (the mass of the Ca component in terms of CaO)/(the total mass of the secondary component as reduced to oxide). The Ca component contained in the insulator 50 is derived from, for example, $CaCO_3$ powder or CaO powder contained in a raw material used for the production of the alumina sintered body.

In another embodiment, a strontium (Sr) component may be contained instead of the Ca component. The oxide of the Sr component is, for example, SrO. Thus, the amount of the Sr component as reduced to oxide and relative to the total mass of the secondary component; i.e., the amount $R_{SrO}$ (mass %), may be defined as (the mass of the Sr component in terms of SrO)/(the total mass of the secondary component as reduced to oxide).

The rare earth component is present in the form of, for example, oxide or ion in the alumina sintered body; During sintering, the rare earth component prevents excessive growth of alumina grains, and the rare earth component and the Si component can form rare earth glass (e.g., La—Si glass) at grain boundaries to thereby increase the melting temperature of a grain-boundary glass phase. Thus, the resultant insulator 50 can exhibit improved withstand voltage.

Examples of the rare earth element contained in the rare earth component include lanthanoid elements, scandium (Sc), and yttrium (Y). Examples of the lanthanide elements include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The rare earth component includes one or more species of these rare earth elements.

The insulator 50 preferably contains a lanthanum (La) component among the aforementioned rare earth components containing rare earth elements. During sintering, the La component and Al can form $LaAl_{11}O_{18}$ crystals to thereby prevent excessive growth of alumina grains and improve mechanical strength.

The oxide of the La component is, for example, $La_2O_3$. Thus, the amount of the La component as reduced to oxide and relative to the total mass of the secondary component; i.e., the amount $RLa_2O_3$ (mass %), may be defined as (the mass of the La component in terms of $La_2O_3$)/(the total mass of the secondary component as reduced to oxide). The La component contained in the insulator 50 is derived from, for example, La(OH); powder or $La_2O_3$ powder contained in a raw material used for the production of the alumina sintered body.

As described above, the insulator 50 contains alumina as a primary component. The insulator 50 further contains, as a secondary component, a silicon (Si) component, a magnesium (Mg) component, a barium (Ba) component, a calcium (Ca) component, and a rare earth component in amounts as described above.

Thus, even when the insulator 50 is used in a high-temperature exposure environment (e.g., about 900° C.), the insulator can exhibit sufficient insulation performance. Therefore, the spark plug 1, which is produced with use of the insulator 50, can maintain withstand voltage at high temperatures over a long period of time.

More specifically, since the amount $R_{SiO2}$ of the Si component in the secondary component is 15.5 (mass %) or more, deterioration of the sinterability of the alumina sintered body can be prevented. Since the amount $R_{SiO2}$ of the Si component in the secondary component is 55.1 (mass %) or less, deterioration of the performance of the insulator due to growth of a grain-boundary glass phase in the alumina sintered body can be prevented.

Since the amount $R_{MgO}$ of the Mg component in the secondary component is 0.6 (mass %) or more, deterioration of the performance of the insulator due to abnormal growth of alumina grains can be prevented. Since the amount $R_{MgO}$ of the Mg component in the secondary component is 7.4 (mass %) or less, deterioration of the performance of the insulator can be prevented.

Since the amount $R_{BaO}$ of the Ba component in the secondary component is 26.7 (mass %) or more, deterioration of the performance of the insulator can be prevented. Since the amount $R_{BaO}$ of the Ba component in the secondary component is 68.5 (mass %) or less, deterioration of the sinterability of the alumina sintered body can be prevented.

Since the amount $R_{CaO}$ of the Ca component in the secondary component is 1.1 (mass %) or more, deterioration of the sinterability of the alumina sintered body can be prevented. Since the amount $R_{CaO}$ of the Ca component in the secondary component is 32.4 (mass %) or less, deterioration of the performance of the insulator can be prevented.

Since the amount $R_{REE}$ of the rare earth component in the secondary component is 11.4 (mass %) or more, deterioration of the performance of the insulator can be prevented. Since the amount $R_{REE}$ of the rare earth component in the secondary component is 46.5 (mass %) or less, deterioration of the sinterability of the alumina sintered body can be prevented.

In the insulator 50 of the present embodiment, more preferably, the amount $R_{BaO}$ of the Ba component and the amount $R_{REE}$ of the rare earth component in the secondary component satisfy the following relations:

(a) $29.1 \le (R_{BaO}) \le 52.5$; and (b) $12.4 \le (R_{REE}) \le 41.5$.

By virtue of the above-described configuration, the withstand voltage of the insulator 50 at high temperatures can be further improved as described in the examples hereinbelow.

When the Ba component and the rare earth component are contained in amounts as described above, the amounts of the Si component, the Mg component, and the Ca component in the secondary component may satisfy, for example, the following relations (see Table 1):

(c) $21.0 \leq (R_{SiO2}) \leq 43.6$;

(d) $1.7 \leq (R_{MgO}) \leq 2.3$; and (e) $1.1 \leq (R_{CaO}) \leq 15.5$.

In the insulator 50 of the present embodiment, still more preferably, the amount $R_{BaO}$ of the Ba component and the amount $R_{REE}$ of the rare earth component in the secondary component satisfy the following relations:

(A) $30.6 \leq (R_{BaO}) \leq 35.3$; and (B) $17.4 \leq (R_{REE}) \leq 29.7$.

By virtue of the above-described configuration, the withstand voltage of the insulator 50 at high temperatures can be further improved as described in the examples hereinbelow.

When the Ba component and the rare earth component are contained in amounts as described above, the amounts of the Si component, the Mg component, and the Ca component in the secondary component may satisfy, for example, the following relations (see Table 1):

(C) $29.9 \leq (R_{SiO2}) \leq 42.3$;

(D) $1.9 \leq (R_{MgO}) \leq 2.3$; and (E) $1.1 \leq (R_{CaO}) \leq 8.4$.

The insulator 50 may contain an additional component other than alumina and the aforementioned secondary component. The additional component is, for example, a component derived from unavoidable impurities, such as a sodium (Na) component.

(Production Method for Insulator)

Next will be described a method for producing the insulator 50.

Firstly, raw material powders of the insulator 50 are provided. The raw material powders are, for example, alumina powder, Si compound powder, Mg compound powder, Ba compound powder, Ca compound powder, and rare earth element compound powder.

Alumina powder of high purity is preferably used, since alumina powder may unavoidably contain an impurity (e.g., Na). For example, the purity of alumina powder is preferably 99.5% or more. Alumina powder having a mean particle size of, for example, 0.1 µm to 5.0 µm is preferably used, whereby a dense alumina sintered body can be produced.

No particular limitation is imposed on the Si compound powder used, so long as the compound can be converted into an Si component through firing. The Si compound powder is, for example, any inorganic powder, such as powder of Si oxide (including composite oxide), hydroxide, carbonate, chloride, sulfate, nitrate, or phosphate. Specifically, the Si compound powder may be, for example, $SiO_2$ powder. When the Si compound powder used is non-oxide powder, the amount of the powder used is determined as an amount (mass %) as reduced to oxide. The purity and mean particle size of the Si compound powder are basically the same as those of the aforementioned alumina powder.

No particular limitation is imposed on the Mg compound powder used, so long as the compound can be converted into an Mg component through firing. The Mg compound powder is, for example, any inorganic powder, such as powder of Mg oxide (including composite oxide), hydroxide, carbonate, chloride, sulfate, nitrate, or phosphate. Specifically, the Mg compound powder may be, for example, MgO powder or $MgCO_3$ powder. When the Mg compound powder used is non-oxide powder, the amount of the powder used is determined as an amount (mass %) as reduced to oxide. The purity and mean particle size of the Mg compound powder are basically the same as those of the aforementioned alumina powder.

No particular limitation is imposed on the Ba compound powder used, so long as the compound can be converted into a Ba component through firing. The Ba compound powder is, for example, any inorganic powder, such as powder of Ba oxide (including composite oxide), hydroxide, carbonate, chloride, sulfate, nitrate, or phosphate. Specifically; the Ba compound powder may be, for example, BaO powder or $BaCO_3$ powder. When the Ba compound powder used is non-oxide powder, the amount of the powder used is determined as an amount (mass %) as reduced to oxide. The purity and mean particle size of the Ba compound powder are basically the same as those of the aforementioned alumina powder.

No particular limitation is imposed on the Ca compound powder used, so long as the compound can be converted into a Ca component through firing. The Ca compound powder is, for example, any inorganic powder, such as powder of Ca oxide (including composite oxide), hydroxide, carbonate, chloride, sulfate, nitrate, or phosphate. Specifically, the Ca compound powder may be, for example, CaO powder or $CaCO_3$ powder. When the Ca compound powder used is non-oxide powder, the amount of the powder used is determined as an amount (mass %) as reduced to oxide. The purity and mean particle size of the Ca compound powder are basically the same as those of the aforementioned alumina powder.

No particular limitation is imposed on the rare earth element compound powder used, so long as the compound can be converted into a rare earth component through firing. The rare earth element compound powder is, for example, any inorganic powder, such as powder of rare earth element oxide (including composite oxide), hydroxide, carbonate, chloride, sulfate, nitrate, or phosphate. Specifically, the rare earth element compound powder may be, for example, $La_2O_3$ powder, $Y_2O_3$ powder, $Nd_2O_3$ powder, or $Yb_2O_3$ powder. When the rare earth element compound powder used is non-oxide powder, the amount of the powder used is determined as an amount (mass %) as reduced to oxide. The purity and mean particle size of the rare earth element compound powder are basically the same as those of the aforementioned alumina powder.

No particular limitation is imposed on the La compound powder (i.e., an example of the rare earth element compound powder) used, so long as the compound can be converted into a La component through firing. The La compound powder is, for example, any inorganic powder, such as powder of La oxide (including composite oxide), hydroxide, carbonate, chloride, sulfate, nitrate, or phosphate. Specifically, the La compound powder may be, for example, $La_2O_3$ powder. When the La compound powder used is non-oxide powder, the amount of the powder used is determined as an amount (mass %) as reduced to oxide. The purity and mean particle size of the La compound powder are basically the same as those of the aforementioned alumina powder.

These powders are mixed in predetermined amounts and dispersed in a solvent, so that the resultant mixture is in the form of slurry. A binder (e.g., a hydrophilic binder) is added to the solvent. The raw material powders and the binder are mixed in the solvent to thereby prepare a raw material slurry.

The amounts of the powders to be mixed may be determined, for example, so as to be the same as those of the corresponding components contained in the alumina sintered body forming the insulator 50. Preferably, the mixing of the raw material powders is performed over, for example, 8 hours or longer so that the powders can be homogeneously mixed and the resultant sintered body can be highly densified.

Example of the solvent used include water and an alcohol. Examples of the hydrophilic binder used include polyvinyl alcohol, water-soluble acrylic resin, gum arabic, and dextrin. These hydrophilic binders or solvents may be used singly or in combination of two or more species. The amount of the hydrophilic binder used is 0.1 to 5.0 parts by mass, preferably 0.5 to 3.0 parts by mass, relative to 100 parts by mass of the raw material powders. When water is used as the solvent, the amount of water is 40 to 120 parts by mass, preferably 50 to 100 parts by mass, relative to 100 parts by mass of the raw material powders.

Subsequently, the raw material slurry is dried by, for example, spray drying to thereby form a particulate product having a mean particle size of 50 to 200 μm, preferably 70 to 150 μm.

Subsequently, the particulate product is subjected to press molding by means of, for example, rubber pressing or die pressing, to thereby form a green compact of the insulator 50 having a shape as shown in FIG. 1. The resultant green compact is trimmed in shape by grinding its outer surface.

The green compact ground into a desired shape is then fired. The firing temperature is determined to fall within a range of, for example, 1,400 to 1,700° C., preferably 1,500 to 1,650° C. In the firing process, the temperature is elevated from ambient temperature to a predetermined firing temperature in an air atmosphere at a temperature elevation rate of, for example, 5 to 15° C./minute. The firing is performed at this firing temperature for, for example, 1 to 15 hours, preferably 3 to 12 hours. Thereafter, the temperature is lowered from this firing temperature to ambient temperature at a temperature lowering rate of, for example, 3 to 20° C./minute. Thus, an alumina sintered body is produced.

Since the temperature elevation rate is 5 to 15° C./minute, the occurrence of cracks due to volatilization of organic components in the green compact can be prevented, and the withstand voltage and mechanical strength of the resultant alumina sintered body can be secured.

Since the firing temperature is 1,400 to 1,700° C., good sinterability is achieved even when the Ba component is contained in a relatively large amount. In addition, abnormal growth of alumina grains is difficult to occur, and thus a dense alumina sintered body can be produced. Since the firing time is 1 to 15 hours, abnormal growth of alumina grains is difficult to occur, and the sintered body is likely to be sufficiently densified. Since the temperature lowering rate is 3 to 20° C./minute, alumina crystals and Ba component-containing crystals having desired grain sizes are likely to be formed.

Therefore, when the temperature elevation rate, the firing temperature, the firing time, and the temperature lowering rate during firing of the green compact are adjusted to fall within the aforementioned ranges, the resultant alumina sintered body can exhibit sufficient withstand voltage even when the spark plug is used in a high-temperature exposure environment (e.g., about 900° C.).

Thus, the insulator 50 formed of the alumina sintered body is produced. The insulator 50 is used as one of the parts for the production of the spark plug 1. Since a conventionally known production method can be applied to the production of the spark plug 1 including the insulator 50, detailed description thereof is omitted.

Summary of Embodiment

As described above, the spark plug 1 according to the present embodiment includes the tubular insulator 50. The insulator contains alumina ($Al_2O_3$) as a primary component, and further contains a secondary component. The secondary component contains a silicon (Si) component, a magnesium (Mg) component, a barium (Ba) component, a calcium (Ca) component, and a rare earth component. The amounts (mass %) of these components as reduced to oxide and relative to the total mass of the secondary component satisfy the following relations (1) to (5):

$$15.5 \leq \text{(the amount of the Si component)} \leq 55.1; \quad (1)$$

$$0.6 \leq \text{(the amount of the Mg component)} \leq 7.4; \quad (2)$$

$$26.7 \leq \text{(the amount of the Ba component)} \leq 68.5; \quad (3)$$

$$1.1 \leq \text{(the amount of the Ca component)} \leq 32.4; \text{ and} \quad (4)$$

$$11.4 \leq \text{(the amount of the rare earth component)} \leq 46.5. \quad (5)$$

The insulator wherein the amounts of the components contained in the secondary component satisfy the aforementioned conditions exhibits a sufficient withstand voltage (e.g., a voltage at dielectric breakdown of 45 (kV/mm) or more) even when used in a high temperature environment (e.g., about 900° C.). Thus, since the spark plug 1 according to the present embodiment includes the insulator 50 exhibiting excellent insulation performance, the spark plug can exhibit sufficient withstand voltage even when the temperature in the combustion chamber is maintained at a high temperature of about 900° C. Therefore, the spark plug does not cause any performance problem even when the temperature in the combustion chamber is maintained at a higher level to enhance the output of an internal combustion engine and improving fuel efficiency.

EXAMPLES

The present invention will next be described by way of examples. The present invention should not be construed as being limited to the following examples.

(Preparation of Insulator Test Piece)

Firstly, an insulator test piece used for a high temperature withstand voltage test was prepared. Alumina powder, $SiO_2$ powder, $MgCO_3$ powder, $BaCO_3$ powder, $CaCO_3$ powder, and $La(OH)_3$ powder were mixed in predetermined amounts, to thereby prepare a raw material powder. Water (i.e., solvent) and a hydrophilic binder were added to the raw material powder to thereby prepare a raw material slurry.

Another raw material slurry was prepared by use of a raw material powder containing, instead of $La(OH)_3$ powder, Y component-containing powder, Nd component-containing powder, or Yb component-containing powder. Yet another raw material slurry was prepared by use of a raw material powder containing, instead of $CaCO_3$ powder, Sr component-containing powder.

The resultant raw material slurry was dried by spray drying to thereby produce powder having a mean particle size of about 100 µm. The mean particle size was measured through laser diffraction by means of a Microtrac particle size distribution measuring apparatus (MT-3000) (product of Nikkiso Co., Ltd.).

The powder was subjected to press molding to thereby form a disk-shaped green compact having a depressed center (i.e., original shape of an insulator test piece 70) (see the broken line frame of FIG. 2). The green compact had an outer thickness (t1) of 1 mm and a depressed portion thickness (t2) of 0.2 mm.

In air, the green compact was heated from room temperature to 1,500° C. (firing temperature) at a temperature elevation rate of 10° C./minute, and then maintained at the firing temperature for 10 hours. Thereafter, the temperature was lowered to room temperature at a temperature lowering rate of 3 to 20° C./minute. Thus, an insulator test piece 70 formed of an alumina sintered body was prepared.

The aforementioned process was repeated to thereby prepare a plurality of insulator test pieces 70 (hereinafter may be referred to simply as "test pieces 70") wherein the amounts of the powders contained in the raw material powder were varied.

The test pieces 70 were classified into Examples (No. 1 to No. 30 and No. 49 to No. 60), Comparative Examples (No. 31 to No. 47), and Referential Examples (No. 61 and No. 62). Table 1 shows the amounts of the powders ($P_{Al2O3}$, $P_{SiO2}$, $P_{MgO}$, $P_{BaO}$, $P_{CaO}$, $P_{La2O3}$) used in the test pieces 70 of Examples (No. 1 to No. 30).

Table 2 shows the amounts of the powders ($P_{Al2O3}$, $P_{SiO2}$, $P_{MgO}$, $P_{BaO}$, $P_{CaO}$, $P_{La2O3}$) used in the test pieces 70 of Comparative Examples (No. 31 to No. 47).

Table 3 shows the amounts of the powders ($P_{Al2O3}$, $P_{SiO2}$, $P_{MgO}$, $P_{BaO}$, $P_{CaO}$, $P_{Y2O3}$ or $P_{Nd2O3}$ or $P_{Yb2O3}$) used in the test pieces 70 of Examples (No. 49 to No. 60) prepared by use of a raw material slurry containing Y component-containing powder, Nd component-containing powder, or Yb component-containing powder as a raw material powder.

Table 4 shows the amounts of the powders ($P_{Al2O3}$, $P_{SiO2}$, $P_{MgO}$, $P_{BaO}$, $P_{SrO}$, $P_{La2O3}$) used in the test pieces 70 of Referential Examples (No. 61 and No. 62) prepared by use of a raw material slurry containing Sr component-containing powder as a raw material powder.

The amounts of the powders (components) shown in each table were calculated by the measurement method described below.

Each of these test pieces 70 was used for the test described below.

(Measurement of Component Amounts in Insulator Test Piece)

Each of the prepared test pieces 70 was cut, and the cut surface was polished to prepare a polished surface. The polished surface was subjected to fluorescent X-ray analysis, to thereby calculate the amount by mass of an Al component as reduced to oxide and relative to the total mass of detected elements (Al, Si, Mg, Ba, Ca, rare earth element (i.e., La, Y, Nd, or Yb)) as reduced to oxide. The same measurement process was performed at five positions, and the arithmetic mean of the resultant values was calculated to thereby determine the amount of the Al component $P_{Al2O3}$. Similarly, the amounts of Si, Mg, Ba, Ca, and rare earth components as reduced to oxide; i.e., $P_{SiO2}$, $P_{MgO}$, $P_{BaO}$, $P_{CaO}$, $P_{La2O3}$ (or $P_{Y2O3}$ or $P_{Nd2O3}$ or $P_{Yb2O3}$) were determined.

Table 1 shows the amounts of the components ($P_{Al2O3}$, $P_{SiO2}$, $P_{MgO}$, $P_{BaO}$, $P_{CaO}$, $P_{La2O3}$) in the prepared test pieces corresponding to Examples (No. 1 to No. 30). Table 2 shows the amounts of the components ($P_{Al2O3}$, $P_{SiO2}$, $P_{MgO}$, $P_{BaO}$, $P_{CaO}$, $P_{La2O3}$) in the prepared test pieces corresponding to Comparative Examples (No. 31 to No. 47). Table 3 shows the amounts of the components ($P_{Al2O3}$, $P_{SiO2}$, $P_{MgO}$, $P_{BaO}$, $P_{CaO}$, $P_{Y2O3}$ (or $P_{Nd2O3}$ or $P_{Yb2O3}$)) in the prepared test pieces corresponding to Examples (No. 49 to No. 60). Table 4 shows the amounts of the components ($P_{Al2O3}$, $P_{SiO2}$, $P_{MgO}$, $P_{BaO}$, $P_{SrO}$), $P_{La2O3}$) in the prepared test pieces corresponding to Referential Examples (No. 61 and No. 62).

The amounts (wt %) of the components shown in Tables 1 to 4 (exclusive of the amount of alumina serving as a primary component) were defined as the total aid amount, and the amount (wt %) of each component of the aid relative to the total aid amount (taken as 100%) was calculated. The amount of each component calculated corresponds to the amount of each component (as reduced to oxide) contained in the aid relative to the total mass of the secondary component.

Table 1 shows the amounts of the components ($R_{SiO2}$, $R_{MgO}$, $R_{BaO}$, $R_{CaO}$, $R_{La2O3}$) of the secondary component in the prepared test pieces corresponding to Examples (No. 1 to No. 30). Table 2 shows the amounts of the components ($R_{SiO2}$, $R_{MgO}$, $R_{BaO}$, $R_{CaO}$, $R_{La2O3}$) of the secondary component in the prepared test pieces corresponding to Comparative Examples (No. 31 to No. 47). Table 3 shows the amounts of the components ($R_{SiO2}$, $R_{MgO}$, $R_{BaO}$, $R_{CaO}$, $R_{Y2O3}$ (or $R_{Nd2O3}$ or $R_{Yb2O3}$)) of the secondary component in the prepared test pieces corresponding to Examples (No. 49 to No. 60).

In the test pieces 70 corresponding to Examples (No. 1 to No. 30 and No. 49 to No. 60), the amounts of the components ($R_{SiO2}$, $R_{MgO}$, $R_{BaO}$, $R_{CaO}$, $R_{REE}$ ($R_{La2O3}$ or $R_{Y2O3}$ or $R_{Nd2O3}$ or $R_{Yb2O3}$)) (mass %) of the secondary component were determined to satisfy all the following relations (1) to (5). In contrast, in the test pieces 70 corresponding to Comparative Examples (No. 31 to No. 47), the amounts of the components ($R_{SiO2}$, $R_{MgO}$, $R_{BaO}$, $R_{CaO}$, $R_{La2O3}$) (mass %) of the secondary component were determined not to satisfy at least any one of the following relations (1) to (5):

(1) $15.5 \leq (R_{SiO2}) \leq 55.1$;

(2) $0.6 \leq (R_{MgO}) \leq 7.4$;

(3) $26.7 \leq (R_{BaO}) \leq 68.5$;

(4) $1.1 \leq (R_{CaO}) \leq 32.4$: and (5) $11.4 \leq (R_{REE}) \leq 46.5$.

In the test pieces 70 corresponding to Referential Examples (No. 61 and No. 62), the amounts of the components ($R_{SiO2}$, $R_{MgO}$, $R_{BaO}$, $R_{SrO}$, $R_{La2O3}$) (mass %) of the secondary component were determined to satisfy all the aforementioned relations (1) to (5) (note: (4) $1.1 \leq (R_{SrO}) \leq 32.4$).

(High Temperature Withstand Voltage Test)

Each test piece 70 was subjected to a high temperature withstand voltage test at 900° C. by means of a withstand voltage measuring apparatus 100 shown in FIG. 2. The withstand voltage measuring apparatus 100 is mainly composed of, for example, a heating box 120, electrodes 123a and 123b, tubular alumina insulators 124a and 124b, a heater 126, and a high voltage generator (CDI power source) 127.

The test piece 70 was sandwiched between the electrode 123a connected to the high voltage generator 127 and the grounded electrode 123b. In this state, the interior of the heating box 120 was heated with the heater 126, to thereby adjust the temperature in the box to 900° C. Subsequently, a voltage was applied between the electrodes 123a and 123b, and the voltage was gradually elevated. The voltage increase rate was 0.5 kV/s.

The applied voltage was elevated as described above, and the voltage at dielectric breakdown (kV/mm) of the test piece 70 (i.e., the voltage at which an increase in voltage failed to continue due to breakage of the test piece 70) was measured. The voltage at dielectric breakdown was used for evaluation of the withstand voltage of the test piece 70 based on the following evaluation criteria.

(Evaluation Criteria of Withstand Voltage)

A: best (voltage at dielectric breakdown (kV/mm) of 60 or more)

B: better (voltage at dielectric breakdown (kV/mm) of 55 or more and less than 60)

C: good (voltage at dielectric breakdown (kV/mm) of 45 or more and less than 55)

X: poor (voltage at dielectric breakdown (kV/mm) of less than 45)

The evaluation results of in the withstand voltage test are shown in Tables 1 to 4.

TABLE 1

| Test piece No. | Amounts of components (wt %) | | | | | | | Amounts of aid components (wt %) | | | | | | Withstand voltage score |
|---|---|---|---|---|---|---|---|---|---|---|---|---|---|---|
| | $P_{Al2O3}$ | $P_{SiO2}$ | $P_{MgO}$ | $P_{BaO}$ | $P_{CaO}$ | $P_{La2O3}$ | Total | $R_{SiO2}$ | $R_{MgO}$ | $R_{BaO}$ | $R_{CaO}$ | $R_{La2O3}$ | Total | |
| 1 | 94.20 | 2.42 | 0.14 | 1.90 | 0.33 | 1.01 | 100.00 | 41.8 | 2.3 | 32.8 | 5.7 | 17.4 | 100.00 | A |
| 2 | 94.08 | 2.43 | 0.13 | 1.97 | 0.07 | 1.32 | 100.00 | 41.1 | 2.1 | 33.3 | 1.1 | 22.4 | 100.00 | A |
| 3 | 94.00 | 2.54 | 0.12 | 1.95 | 0.08 | 1.31 | 100.00 | 42.3 | 2.1 | 32.5 | 1.4 | 21.6 | 100.00 | A |
| 4 | 93.93 | 2.02 | 0.13 | 2.05 | 0.51 | 1.36 | 100.00 | 33.4 | 2.1 | 33.7 | 8.4 | 22.4 | 100.00 | A |
| 5 | 93.82 | 2.10 | 0.14 | 2.11 | 0.43 | 1.40 | 100.00 | 34.0 | 2.2 | 34.2 | 6.9 | 22.7 | 100.00 | A |
| 6 | 93.90 | 2.14 | 0.12 | 2.06 | 0.44 | 1.34 | 100.00 | 35.1 | 2.0 | 33.7 | 7.2 | 22.0 | 100.00 | A |
| 7 | 93.71 | 1.94 | 0.12 | 1.97 | 0.39 | 1.87 | 100.00 | 30.9 | 2.0 | 31.3 | 6.2 | 29.7 | 100.00 | A |
| 8 | 93.70 | 2.06 | 0.12 | 1.93 | 0.34 | 1.84 | 100.00 | 32.8 | 2.0 | 30.6 | 5.4 | 29.2 | 100.00 | A |
| 9 | 93.59 | 1.92 | 0.12 | 2.26 | 0.27 | 1.84 | 100.00 | 29.9 | 1.9 | 35.3 | 4.2 | 28.7 | 100.00 | A |
| 10 | 93.54 | 2.03 | 0.12 | 2.24 | 0.24 | 1.83 | 100.00 | 31.5 | 1.9 | 34.7 | 3.7 | 28.3 | 100.00 | A |
| 11 | 93.51 | 1.87 | 0.12 | 1.89 | 0.26 | 2.33 | 100.00 | 28.8 | 1.8 | 29.1 | 4.3 | 35.9 | 100.00 | B |
| 12 | 93.52 | 1.63 | 0.13 | 3.40 | 0.51 | 0.80 | 100.00 | 25.2 | 2.0 | 52.5 | 7.9 | 12.4 | 100.00 | B |
| 13 | 93.11 | 1.45 | 0.12 | 2.01 | 0.46 | 2.86 | 100.00 | 21.0 | 1.7 | 29.2 | 6.6 | 41.5 | 100.00 | B |
| 14 | 93.92 | 1.71 | 0.14 | 2.45 | 0.94 | 0.64 | 100.00 | 28.1 | 2.3 | 40.3 | 15.5 | 13.8 | 100.00 | B |
| 15 | 94.17 | 2.48 | 0.13 | 2.20 | 0.07 | 0.95 | 100.00 | 42.6 | 2.2 | 37.6 | 1.2 | 16.2 | 100.00 | B |
| 16 | 94.08 | 2.58 | 0.12 | 2.20 | 0.06 | 0.93 | 100.00 | 43.6 | 2.1 | 37.1 | 1.4 | 15.8 | 100.00 | B |
| 17 | 94.77 | 2.16 | 0.13 | 2.04 | 0.31 | 0.60 | 100.00 | 41.3 | 2.4 | 39.0 | 5.9 | 11.4 | 100.00 | C |
| 18 | 94.09 | 2.16 | 0.13 | 2.04 | 0.07 | 1.51 | 100.00 | 36.6 | 2.2 | 34.6 | 1.1 | 25.6 | 100.00 | C |
| 19 | 94.29 | 2.16 | 0.13 | 1.61 | 0.31 | 1.51 | 100.00 | 37.8 | 2.2 | 28.1 | 5.4 | 26.4 | 100.00 | C |
| 20 | 92.56 | 4.10 | 0.12 | 2.20 | 0.08 | 0.93 | 100.00 | 55.1 | 1.7 | 29.6 | 1.1 | 12.5 | 100.00 | C |
| 21 | 93.56 | 1.00 | 0.12 | 2.01 | 0.46 | 2.86 | 100.00 | 15.5 | 1.8 | 31.2 | 7.1 | 44.4 | 100.00 | C |
| 22 | 94.00 | 2.42 | 0.33 | 1.90 | 0.33 | 1.01 | 100.00 | 40.4 | 5.5 | 31.7 | 5.5 | 16.8 | 100.00 | C |
| 23 | 93.88 | 2.42 | 0.45 | 1.90 | 0.33 | 1.01 | 100.00 | 39.6 | 7.4 | 31.1 | 5.4 | 16.5 | 100.00 | C |
| 24 | 93.19 | 1.45 | 0.04 | 2.01 | 0.46 | 2.86 | 100.00 | 21.3 | 0.6 | 29.5 | 6.7 | 41.9 | 100.00 | C |
| 25 | 91.79 | 1.41 | 0.08 | 5.62 | 0.14 | 0.96 | 100.00 | 17.1 | 1.0 | 68.5 | 1.7 | 11.7 | 100.00 | C |
| 26 | 92.89 | 1.71 | 0.15 | 2.44 | 1.67 | 1.14 | 100.00 | 24.0 | 2.1 | 34.4 | 23.5 | 16.0 | 100.00 | C |
| 27 | 91.96 | 1.71 | 0.15 | 2.44 | 2.60 | 1.14 | 100.00 | 21.3 | 1.8 | 30.4 | 32.4 | 14.2 | 100.00 | C |
| 28 | 92.47 | 1.45 | 0.12 | 2.01 | 0.46 | 3.50 | 100.00 | 19.2 | 1.5 | 26.7 | 6.0 | 46.5 | 100.00 | C |
| 29 | 96.52 | 1.21 | 0.07 | 1.16 | 0.18 | 0.86 | 100.00 | 35.1 | 2.1 | 33.2 | 5.0 | 24.6 | 100.00 | C |
| 30 | 91.47 | 3.02 | 0.18 | 2.82 | 0.43 | 2.09 | 100.00 | 35.1 | 2.1 | 33.2 | 5.0 | 24.6 | 100.00 | C |

TABLE 2

| Test piece No. | Amounts of components (wt %) | | | | | | | Amounts of aid components (wt %) | | | | | | Withstand voltage score |
|---|---|---|---|---|---|---|---|---|---|---|---|---|---|---|
| | $P_{Al2O3}$ | $P_{SiO2}$ | $P_{MgO}$ | $P_{BaO}$ | $P_{CaO}$ | $P_{La2O3}$ | Total | $R_{SiO2}$ | $R_{MgO}$ | $R_{BaO}$ | $R_{CaO}$ | $R_{La2O3}$ | Total | |
| 31 | 94.61 | 2.64 | 0.14 | 1.77 | 0.37 | 0.47 | 100.00 | 49.0 | 2.5 | 32.8 | 7.0 | 8.7 | 100.00 | x |
| 32 | 93.70 | 1.91 | 0.12 | 1.41 | 0.48 | 2.36 | 100.00 | 30.3 | 1.9 | 22.4 | 7.6 | 37.8 | 100.00 | x |
| 33 | 93.16 | 1.71 | 0.11 | 1.27 | 0.18 | 3.56 | 100.00 | 25.1 | 1.6 | 18.5 | 2.7 | 52.1 | 100.00 | x |
| 34 | 93.45 | 1.51 | 0.12 | 1.11 | 0.63 | 2.97 | 100.00 | 23.0 | 1.6 | 17.0 | 12.7 | 45.4 | 100.00 | x |
| 35 | 93.99 | 1.67 | 0.13 | 1.24 | 1.19 | 1.77 | 100.00 | 27.9 | 2.2 | 20.6 | 19.6 | 29.5 | 100.00 | x |
| 36 | 93.03 | 1.09 | 0.12 | 1.30 | 0.97 | 3.48 | 100.00 | 15.7 | 1.7 | 18.7 | 14.0 | 50.0 | 100.00 | x |
| 37 | 94.45 | 1.40 | 0.15 | 0.70 | 2.18 | 1.12 | 100.00 | 25.2 | 2.7 | 12.6 | 39.3 | 20.1 | 100.00 | x |
| 38 | 92.20 | 4.40 | 0.12 | 2.25 | 0.09 | 0.93 | 100.00 | 56.4 | 1.6 | 28.9 | 1.2 | 12.0 | 100.00 | x |
| 39 | 93.61 | 0.95 | 0.12 | 2.01 | 0.46 | 2.86 | 100.00 | 14.9 | 1.8 | 31.5 | 7.1 | 44.7 | 100.00 | x |
| 40 | 93.84 | 2.42 | 0.49 | 1.90 | 0.33 | 1.01 | 100.00 | 39.3 | 8.0 | 30.9 | 5.4 | 16.4 | 100.00 | x |
| 41 | 93.21 | 1.45 | 0.02 | 2.01 | 0.46 | 2.86 | 100.00 | 21.3 | 0.3 | 29.6 | 6.7 | 42.1 | 100.00 | x |
| 42 | 91.78 | 1.36 | 0.08 | 5.67 | 0.14 | 0.97 | 100.00 | 16.6 | 1.0 | 69.0 | 1.7 | 11.8 | 100.00 | x |
| 43 | 94.38 | 2.16 | 0.13 | 1.51 | 0.31 | 1.51 | 100.00 | 38.5 | 2.3 | 26.9 | 5.5 | 26.9 | 100.00 | x |
| 44 | 91.76 | 1.71 | 0.15 | 2.44 | 2.80 | 1.14 | 100.00 | 20.7 | 1.8 | 29.6 | 34.0 | 13.8 | 100.00 | x |
| 45 | 94.11 | 2.16 | 0.13 | 2.04 | 0.05 | 1.51 | 100.00 | 36.7 | 2.2 | 34.7 | 0.8 | 25.6 | 100.00 | x |
| 46 | 92.28 | 1.45 | 0.12 | 2.20 | 0.26 | 3.70 | 100.00 | 16.8 | 1.5 | 28.5 | 3.4 | 47.9 | 100.00 | x |
| 47 | 94.86 | 2.16 | 0.13 | 2.04 | 0.31 | 0.50 | 100.00 | 42.0 | 2.5 | 39.8 | 6.0 | 9.7 | 100.00 | x |

TABLE 3

| Test piece No. | Amounts of components (wt %) | | | | | | | Amounts of aid components (wt %) | | | | | | Withstand voltage score |
|---|---|---|---|---|---|---|---|---|---|---|---|---|---|---|
| | $P_{Al2O3}$ | $P_{SiO2}$ | $P_{MgO}$ | $P_{BaO}$ | $P_{CaO}$ | $PY_{2O3}$ | Total | $R_{SiO2}$ | $R_{MgO}$ | $R_{BaO}$ | $R_{CaO}$ | $RY_{2O3}$ | Total | |
| 49 | 94.18 | 2.42 | 0.14 | 1.90 | 0.33 | 1.03 | 100.00 | 41.6 | 2.3 | 32.7 | 5.7 | 17.7 | 100.00 | A |
| 50 | 93.83 | 2.10 | 0.14 | 2.11 | 0.43 | 1.39 | 100.00 | 34.1 | 2.2 | 34.2 | 6.9 | 22.6 | 100.00 | A |
| 51 | 93.73 | 1.94 | 0.12 | 1.97 | 0.39 | 1.85 | 100.00 | 31.0 | 2.0 | 31.4 | 6.2 | 29.5 | 100.00 | A |
| 52 | 91.96 | 1.71 | 0.15 | 2.44 | 2.60 | 1.14 | 100.00 | 21.3 | 1.8 | 30.4 | 32.4 | 14.2 | 100.00 | C |

| Test piece No. | Amounts of components (wt %) | | | | | | | Amounts of aid components (wt %) | | | | | | Withstand voltage score |
|---|---|---|---|---|---|---|---|---|---|---|---|---|---|---|
| | $P_{Al2O3}$ | $P_{SiO2}$ | $P_{MgO}$ | $P_{BaO}$ | $P_{CaO}$ | $PNd_{2O3}$ | Total | $R_{SiO2}$ | $R_{MgO}$ | $R_{BaO}$ | $R_{CaO}$ | $RNd_{2O3}$ | Total | |
| 53 | 94.15 | 2.42 | 0.14 | 1.90 | 0.33 | 1.08 | 100.00 | 41.4 | 2.3 | 32.5 | 5.7 | 18.1 | 100.00 | A |
| 54 | 93.81 | 2.10 | 0.14 | 2.11 | 0.43 | 1.41 | 100.00 | 34.0 | 2.2 | 34.1 | 6.9 | 22.9 | 100.00 | A |
| 55 | 93.72 | 1.94 | 0.12 | 1.97 | 0.39 | 1.86 | 100.00 | 30.9 | 2.0 | 31.3 | 6.2 | 29.6 | 100.00 | A |
| 56 | 91.95 | 1.71 | 0.15 | 2.44 | 2.60 | 1.15 | 100.00 | 21.2 | 1.8 | 30.3 | 32.3 | 14.3 | 100.00 | C |

| Test piece No. | Amounts of components (wt %) | | | | | | | Amounts of aid components (wt %) | | | | | | Withstand voltage score |
|---|---|---|---|---|---|---|---|---|---|---|---|---|---|---|
| | $P_{Al2O3}$ | $P_{SiO2}$ | $P_{MgO}$ | $P_{BaO}$ | $P_{CaO}$ | $PYb_{2O3}$ | Total | $R_{SiO2}$ | $R_{MgO}$ | $R_{BaO}$ | $R_{CaO}$ | $RYb_{2O3}$ | Total | |
| 57 | 94.19 | 2.42 | 0.14 | 1.90 | 0.33 | 1.02 | 100.00 | 41.7 | 2.3 | 32.7 | 5.7 | 17.5 | 100.00 | A |
| 58 | 93.80 | 2.10 | 0.14 | 2.11 | 0.43 | 1.42 | 100.00 | 33.9 | 2.2 | 34.1 | 6.9 | 23.0 | 100.00 | A |
| 59 | 93.74 | 1.94 | 0.12 | 1.97 | 0.39 | 1.84 | 100.00 | 31.0 | 2.0 | 31.4 | 6.2 | 29.3 | 100.00 | A |
| 60 | 91.95 | 1.71 | 0.15 | 2.44 | 2.60 | 1.15 | 100.00 | 21.2 | 1.8 | 30.3 | 32.3 | 14.3 | 100.00 | C |

TABLE 4

| Test piece No. | Amounts of components (wt %) | | | | | | | Amounts of aid components (wt %) | | | | | | Withstand voltage score |
|---|---|---|---|---|---|---|---|---|---|---|---|---|---|---|
| | $P_{Al2O3}$ | $P_{SiO2}$ | $P_{MgO}$ | $P_{BaO}$ | $PSrO$ | $P_{La2O3}$ | Total | $R_{SiO2}$ | $R_{MgO}$ | $R_{BaO}$ | $RSrO$ | $R_{La2O3}$ | Total | |
| 61 | 93.55 | 1.00 | 0.12 | 2.01 | 0.46 | 2.87 | 100.00 | 15.5 | 1.8 | 31.2 | 7.1 | 44.4 | 100.00 | C |
| 62 | 93.88 | 2.14 | 0.12 | 2.06 | 0.44 | 1.36 | 100.00 | 35.0 | 2.0 | 33.6 | 7.1 | 22.2 | 100.00 | A |

As shown in Tables 1 and 3, the test pieces 70 corresponding to Examples (No. 1 to No. 30 and No. 49 to No. 60) exhibited good results in the withstand voltage test. Specifically, all the test pieces 70 corresponding to the Examples exhibited a voltage at dielectric breakdown (kV/mm) of 45 or more.

As shown in Table 2, the test pieces 70 corresponding to Comparative Examples (No. 31 to No. 47) exhibited poor withstand voltage. Specifically, all the test pieces 70 corresponding to the Comparative Examples exhibited a voltage at dielectric breakdown (kV/mm) of less than 45.

As shown in Table 4, the test pieces 70 corresponding to Referential Examples (No. 61 and No. 62) exhibited good results in the withstand voltage test. Specifically, all the test pieces 70 corresponding to the Referential Examples exhibited a voltage at dielectric breakdown (kV/mm) of 45 or more.

These tests showed that when the amounts of the components ($R_{SiO2}$, $R_{MgO}$, $R_{BaO}$, $R_{CaO}$, $R_{REE}$) (mass %) of the secondary component satisfied all the following relations (1) to (5) in the test piece 70, the insulator exhibited further improved withstand voltage at a high temperature of about 900° C.

(1) $15.5 \leq (R_{SiO2}) \leq 55.1$;

(2) $0.6 \leq (R_{MgO}) \leq 7.4$;

(3) $26.7 \leq (R_{BaO}) \leq 68.5$;

(4) $1.1 \leq (R_{CaO}) \leq 32.4$; and (5) $11.4 \leq (R_{REE}) \leq 46.5$.

As shown in Table 1, the test pieces 70 corresponding to test pieces No. 1 to No. 16 exhibited better results (i.e., evaluation of A or B) in the withstand voltage test. Specifically, all these test pieces 70 exhibited a voltage at dielectric breakdown (kV/mm) of 55 or more.

The test showed that when the amount $R_{BaO}$ of the Ba component and the amount $R_{REE}$ (specifically $R_{La2O3}$) of the rare earth component in the secondary component satisfied the following relations (a) and (b) in the test piece 70, the insulator exhibited more improved withstand voltage at a high temperature of about 900° C.

(a) $29.1 \leq (R_{BaO}) \leq 52.5$; and (b) $12.4 \leq (R_{REE}) \leq 41.5$.

As shown in Table 1, the test pieces 70 corresponding to test pieces No. 1 to No. 10 exhibited best results (i.e., evaluation of A) in the withstand voltage test. Specifically, all these test pieces 70 exhibited a voltage at dielectric breakdown (kV/mm) of 60 or more.

The test showed that when the amount $R_{BaO}$ of the Ba component and the amount $R_{REE}$ (specifically $R_{La2O3}$) of the rare earth component in the secondary component satisfied the following relations (A) and (B) in the test piece 70, the insulator exhibited further improved withstand voltage at a high temperature of about 900° C.

$$(A)\ 30.6 \le (R_{BaO}) \le 35.3;\ \text{and}$$

$$(B)\ 17.4 \le (R_{REE}) \le 29.7.$$

The embodiments disclosed herein should be considered to be illustrative and not restrictive in all aspects. It is intended that the scope of the present invention is shown by the claims rather than the aforementioned description, and the present invention encompasses all modifications within the meanings and scopes equivalent to those of the claims. Also, the present invention encompasses configurations obtained by combining the configurations of different embodiments described in the present specification.

REFERENCE SIGNS LIST

1: spark plug
11: ground electrode
20: center electrode
30: metallic shell
50: insulator
70: insulator test piece

The invention claimed is:

1. A tubular insulator for a spark plug, wherein
the insulator contains alumina as a primary component, and further contains a secondary component;
the secondary component contains a silicon (Si) component, a magnesium (Mg) component, a barium (Ba) component, a calcium (Ca) component, and a rare earth component; and
the amounts (mass %) of these components as reduced to oxide and relative to the total mass of the secondary component satisfy the following relations (1) to (5):

$$15.5 \le (\text{the amount of the Si component}) \le 55.1; \quad (1)$$

$$0.6 \le (\text{the amount of the Mg component}) \le 7.4; \quad (2)$$

$$26.7 \le (\text{the amount of the Ba component}) \le 68.5; \quad (3)$$

$$1.1 \le (\text{the amount of the Ca component}) \le 32.4; \quad (4)$$

$$11.4 \le (\text{the amount of the rare earth component}) \le 46.5;\ \text{and} \quad (5)$$

wherein the amount (mass %) of the alumina relative to the total mass of the insulator falls within a range of 91.0 mass % to 97.0 mass %.

2. An insulator according to claim 1, wherein the amounts (mass %) of the Ba component and the rare earth component as reduced to oxide and relative to the total mass of the secondary component further satisfy the following relations (a) and (b):

$$29.1 \le (\text{the amount of the Ba component}) \le 52.5;\ \text{and} \quad (a)$$

$$12.4 \le (\text{the amount of the rare earth component}) \le 41.5. \quad (b)$$

3. An insulator according to claim 2, wherein the amounts (mass %) of the Ba component and the rare earth component as reduced to oxide and relative to the total mass of the secondary component further satisfy the following relations (A) and (B):

$$30.6 \le (\text{the amount of the Ba component}) \le 35.3;\ \text{and} \quad (A)$$

$$17.4 \le (\text{the amount of the rare earth component}) \le 29.7. \quad (B)$$

4. An insulator according to claim 1, wherein the rare earth component is a lanthanum (La) component.

5. A spark plug comprising:
an insulator as recited in claim 1;
a tubular metallic shell which holds at least a portion of the insulator therein;
a center electrode which is disposed at a forward end of the insulator; and
a ground electrode which is attached to the metallic shell and provides a gap between the ground electrode and the center electrode.

* * * * *